(12) United States Patent
Barré et al.

(10) Patent No.: US 6,471,898 B1
(45) Date of Patent: Oct. 29, 2002

(54) METHOD FOR REDUCING MOISTURE CONTENT

(75) Inventors: Louis Barré, Verdun (CA); Marcel Bilodeau, Moisie (CA)

(73) Assignee: Solutions Mabarex Inc., Saint-Laurent (CA)

( * ) Notice: Subject to any disclaimer, the term of this patent is extended or adjusted under 35 U.S.C. 154(b) by 0 days.

(21) Appl. No.: 09/435,791

(22) Filed: Nov. 8, 1999

Related U.S. Application Data

(63) Continuation of application No. PCT/CA98/00461, filed on May 11, 1998.

(30) Foreign Application Priority Data

May 9, 1997 (CA) .............................................. 2204926

(51) Int. Cl.[7] .............................................. B29B 13/06
(52) U.S. Cl. ..................... 264/115; 34/507; 264/340; 210/767; 210/808
(58) Field of Search .......................... 34/219, 224, 475, 34/92, 443, 507; 210/137, 199, 205, 767, 808; 264/109, 115, 232, 340

(56) References Cited

U.S. PATENT DOCUMENTS

| | | | |
|---|---|---|---|
| 4,219,942 A | 9/1980 | Coliva | |
| 4,768,292 A | 9/1988 | Manzei | |
| 5,428,904 A | 7/1995 | Rutz | |
| 5,653,872 A | 8/1997 | Cohan | |
| 6,101,739 A | * | 8/2000 | Rutz et al. |
| 6,151,798 A | * | 11/2000 | Petersen |

FOREIGN PATENT DOCUMENTS

| | | |
|---|---|---|
| DE | 39 33 576 | 2/1992 |
| DE | 195 02 273 | 8/1996 |

* cited by examiner

Primary Examiner—Mathieu D. Vargot
(74) Attorney, Agent, or Firm—Ogilvy Renault; Robert Mitchell

(57) ABSTRACT

A system and a method for reducing the level of moisture of fluent materials or wet solid materials, characterized in that the material to be treated is provided in a particle form and then exposed to a relatively high volumetric flow of gas treating medium which is drawn through the material so as to force the moisture in the center of each individual piece to migrate towards the periphery thereof where it can be easily evaporated. Air at ambient temperature may be used as gas treating medium so as to minimize the level of energy required to provide an efficient drying operation.

17 Claims, 8 Drawing Sheets

METHOD FOR REDUCING MOISTURE CONTENT

RELATED APPLICATIONS

This is a continuation of International PCT Application No. PCT/CA98/00461 filed on May 11, 1998, which claims benefit of Canadian Application No. 2,204,926.

FIELD OF THE INVENTION

This invention relates to a method and a system for reducing the moisture content of a moist material and, more particularly, pertains to a drying system and method wherein the treating medium is drawn through the moist material to be treated.

BACKGROUND OF THE INVENTION

Over the years various systems and methods have been developed for removing liquid components from moist materials such as sewage sludge, bagasse, de-inked paper sludge, biological sludge, wood pulp, bark, woodchips, slurry, peat and pasty products of different types. For instance, U.S. Pat. No. 4,768,292 issued to Manzei on Sep. 6, 1988 and U.S. Pat. No. 5,653,872 issued to Cohan on Aug. 5, 1997 each disclose a thermal drying system in which the sewage sludge to be treated is reduced into pellet masses and then exposed to a heated gaseous treating medium to drive off a portion of the moisture contents of the sewage sludge. The heated gaseous medium flows through the sewage sludge by operation of a blower fan.

More particularly, the thermal drying system described in U.S. Pat. No. 4,768,292 generally includes a pair of upper and lower porous conveyors vertically superposed and staggered so that the pellet masses will drop from the upper conveyor to the lower conveyor which is driven in a direction opposite to that of the upper conveyor. The hot gaseous medium travels successively and alternately from the layer of pellet masses through perforations defined in the supporting surfaces of the conveyors and from the perforations through the layer of pellet masses to provide an homogeneous and decreasing level of moisture.

Although the above thermal drying systems are effective for removing a portion of the moisture content of the moist material, they require a high level of energy as they all necessitate that the gaseous treating medium be heated at relatively high temperatures.

Accordingly, there is a need for a drying method which is economical while maintaining a high efficiency for removing liquids and/or moisture from the moist material to be treated. Another disadvantage of such thermal drying systems is that they dry an exterior layer of the pellets before the core thereof, thereby forming a barrier to the subsequent extraction of the moisture from the core of the pellets.

In another art, as illustrated by U.S. Pat. No. 4,219,942 issued to Coliva on Sep. 2, 1980, it is known to draw heated air through a damp fabric to dry the same and thus generate a shrinking and stabilizing effect. However, this drying system also requires a lot of energy as the drying process is still carried out by a thermal effect due to a flow of hot air.

Therefore, it would be highly valuable to introduce a drying system which could operate at ambient and low temperatures.

SUMMARY OF THE INVENTION

It is therefore an aim of the present invention to provide a drying system and method which requires a relatively low level of energy.

It is also an aim of the present invention to provide a drying system which could operate at ambient and relatively low temperatures.

It is also an aim of the present invention to provide a drying system in which the material to be treated is dried from a central portion to an outer layer thereof.

It is also an aim of the present invention to provide a drying system in which different residual moisture contents of the treated material may be obtained.

It is still an aim of the present invention to provide such a drying system which is adapted to minimize the time required to dry the moist material.

It is a further aim of the present invention to provide a method suitable for recycling waste materials into useful products such as fertilizers, soil conditioners, absorbent materials or combustion agents.

Therefore, in accordance with the present invention, there is provided a method for reducing moisture content of a moist material having an external surface, comprising the steps of increasing the exterior surface of the moist material, and drawing a relatively dry gaseous fluid through the moist material.

Also in accordance with the present invention, the method includes the step of separating the moist material into individual pieces prior to drawing a gaseous drying medium therethrough.

Typically, the gaseous drying medium flows by suction from an upstream side to a downstream side of each individual piece at a relatively high rate such as to sufficiently reduce the pressure on the downstream side of each individual piece and so causing moisture located in a central portion thereof to migrate near the external exposed surfaces of each individual piece substantially on the downstream side thereof.

Also in accordance with the present invention, there is provided a pelletizer for transforming a pasty material into a plurality of pellets. The pelletizer comprises a perforated plate means defining a plurality of openings, means for forcing the pasty material to pass through the perforated plate means from an inner surface thereof to an outer surface thereof, and cutting means adjacent the outer surface of the perforated plate means for transversally cutting the pasty material emanating from the perforated plate means.

Typically, the cutting means include a displaceable perforated plate means disposed downstream of the perforated plate means and defining a plurality of openings, and means for imparting a reciprocating motion to the displaceable plate means such as to alternately align and offset the openings of the displaceable perforated plate means with the openings of the perforated plate means.

Also in accordance with the present invention, there is provided a pelletizer for transforming a pasty material into a plurality of pellets, comprising a number of interchangeable perforated plate means, and means for forcing the pasty material to pass through one of the interchangeable perforated plate means selected according to the pasty material to be treated.

Also in accordance with the present invention, there is provided an apparatus for shredding solid materials into smaller pieces, comprising a housing defining a material inlet and a material outlet, at least two series of spaced-apart crowned discs mounted in an offset relationship on respective parallel shafts and rotatably driven in opposite directions for drawing and cutting the solid material supplied through the material inlet of the housing.

Also in accordance with the present invention, there is provided a screw conveyor comprising a substantially elongated casing defining opposed material inlet and outlet means and having an arcuate porous bottom wall, and a rotating screw axially mounted to the elongated casing for displacing a pasty material having a viscosity from the material inlet means to the material outlet means while at the same time compressing the pasty material against an inner surface of the arcuate porous bottom wall thereby causing some liquid from the pasty material to flow therethrough, and means for adjusting the inclination of the screw conveyor according to the viscosity of the pasty material to be treated.

Also in accordance with the present invention, there is provided a screw conveyor comprising a rotating screw mounted within an elongated casing for displacing a pasty material from a material inlet means to a material outlet means defined at opposed end portions of said elongated casing, the casing having a flexible arcuate bottom wall for allowing the screw conveyor to accommodate various quantity of pasty material.

Typically, the flexible arcuate bottom wall is releasably mounted to an upper portion of the elongated casing to permit disengagement thereof when the pressure exerted thereon reaches a critical point.

BRIEF DESCRIPTION OF THE DRAWINGS

Having thus generally described the nature of the invention, reference will now be made to the accompanying drawings, showing by way of illustration a preferred embodiment thereof and in which:

FIG. 2b is a schematic end view of the screw conveyor-compactor apparatus of FIG. 2a;

FIG. 5b is a schematic side elevational view partly in cross-section of the shredder of FIG. 5a;

FIG. 6b is a schematic cross-sectional view of the dryer of FIG. 6a.

DESCRIPTION OF THE PREFERRED EMBODIMENT

Figure 1:
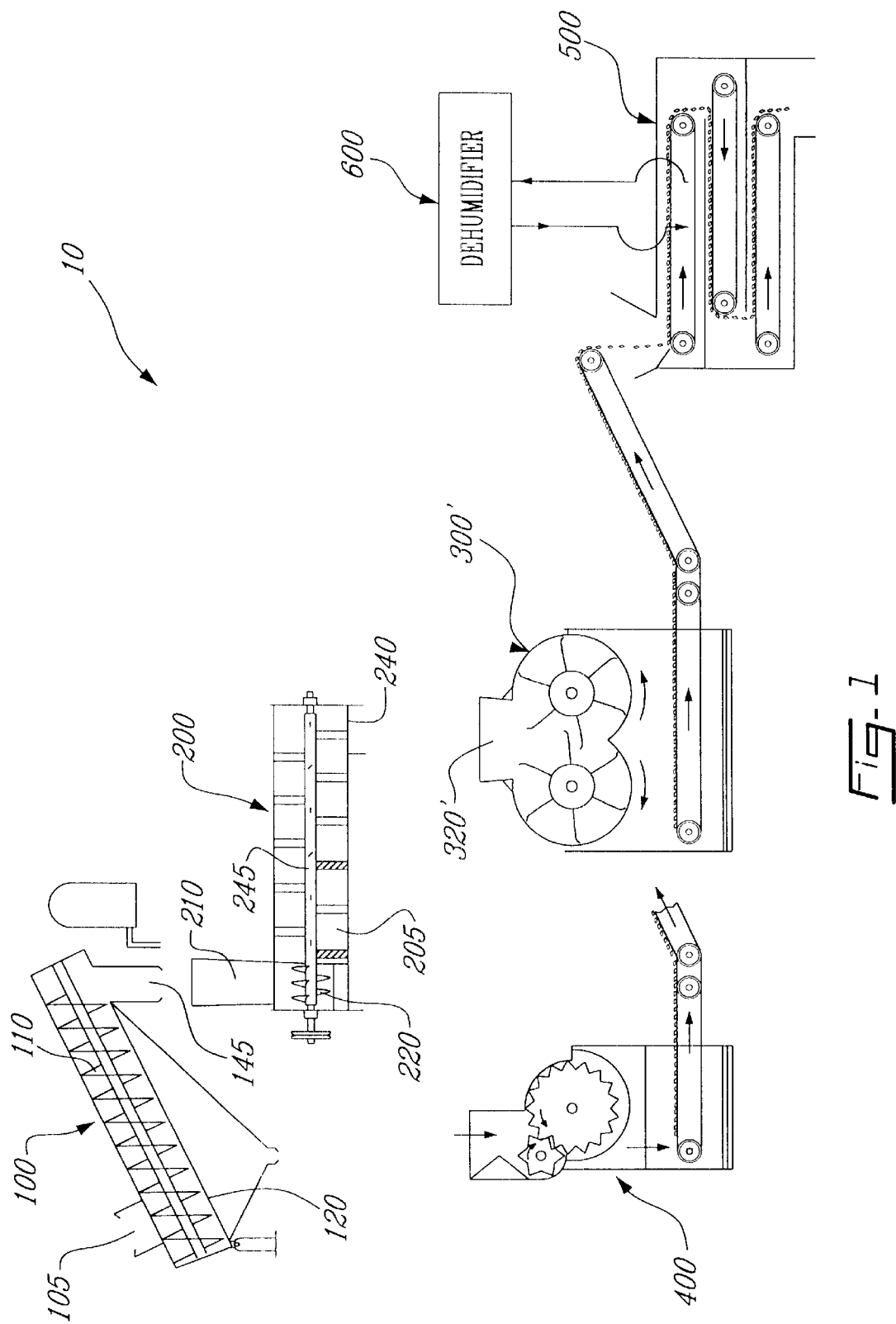
FIG. 1 is a schematic view of a granulating, pelletizing, grinding and drying system in accordance with the present invention.

Now referring to the drawings, and in particular to FIG. 1, a drying system in accordance with the present invention and generally designated by numeral 10 will be described.

The system 10, as will be explained hereinafter, is adapted to remove liquids and/or moisture from a moist material such as sewage sludge, bagasse, de-inked paper sludge, primary sludge, biological sludge, wood pulp, bleached thermo-chemico mechanical pulp, bark, woodchips, lumber residues, slurry, peat and pasty products of different types.

As shown in FIG. 1, depending on the material to be treated, the drying system 10 essentially comprises a pelletizer 300 or a shredder 400 and a dryer 500. It is understood that the shredder 400 is used in connection with wet solid materials, such as bark, whereas the pelletizer 300 is used to treat fluent materials, such as sludge. Optionally, and more particularly when the pelletizer 300 is used, a screw compactor-conveyor 100 and a mixer 200 or cutter mixer 200' may be provided upstream of the pelletizer 300.

Generally, different products will require different preparations before drying. For instance, wet materials having a pasty consistency can be conveyed directly to the screw compactor-conveyor 100 to remove a portion of the water content thereof by compression against a flexible porous bottom 120 of the screw compactor conveyor 100, as will be explained hereinafter. Then, the extracted liquid is returned to an initial operation for recycling purposes. Once the above-described preliminary dewatering operation has been completed, the partly dried pasty material can be conveyed to the mixer 200 or cutter-mixer 200' to add various additives if required. Thereafter, the pasty material is subjected to pelletization so as to transform the material into pellet-like mass, thereby increasing the exposed surface of the pasty material.

If wet solid materials are to be treated, the screw compactor-conveyor 100, the cutter 200 or cutter mixer 200' and the pelletizer 300 are omitted and the wet solid materials are conveyed to the shredder 400 which is adapted to break the solid materials into smaller pieces thereby offering more exposed surface for the subsequent drying operation.

The pasty material emanating from the pelletizer 300 or the wet solid materials leaving the shredder 400 are conveyed to the dryer 600 where a gas treating medium, such as ambient air, is drawn by vacuum at high velocity through the material to be dried in order to obtain a desired moisture content. The resulting humid air is evacuated in the room or to the outside of the building. The process may further include an air dehumidifying step 600, as schematically depicted in FIG. 1.

The dried materials can be immediately used in a co-generation energy system (not shown) which can be placed just beside. The material can also be delivered in bulk for the industrial, institutional or commercial market as an absorbing product, a littering product or as a combustible. Accordingly, it can be said that the drying system 10 of the present invention contributes to reduce pollution by recycling waste material or the like.

Figure 2A:
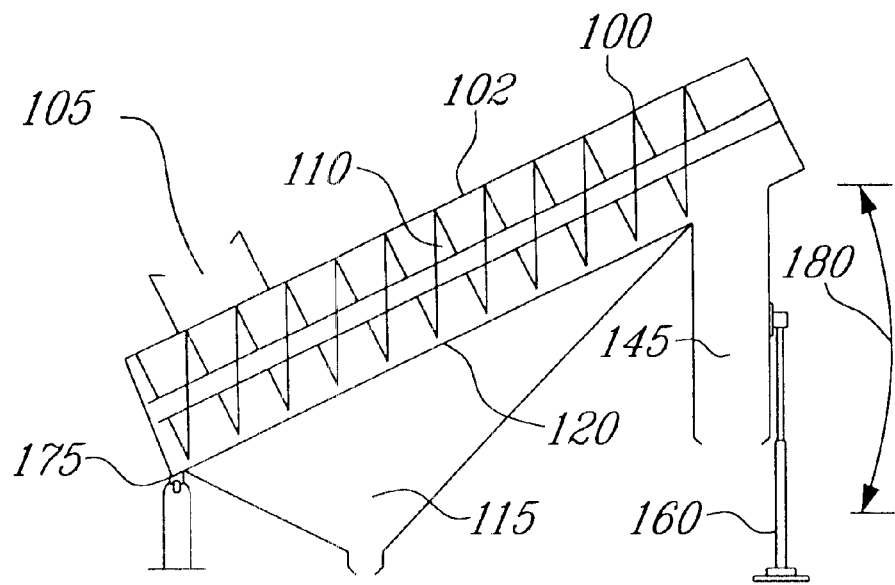
FIG. 2a is a schematic side elevational view partly in cross-section of a screw conveyor-compactor apparatus.
Figure 2B:
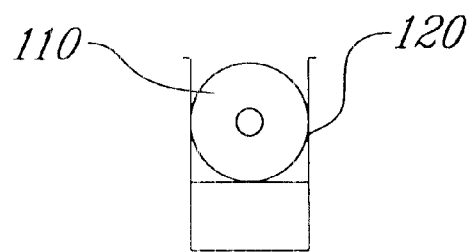

Referring now to FIGS. 2a and 2b, it can be seen that the screw conveyor-compactor 100 includes a rotating helical screw 110 concentrically disposed in an elongated cylindrical casing or trough 102 defining at a first end thereof a material inlet 105 and at a second opposed end thereof a material outlet 145. The casing 102 is provided with a flexible porous bottom wall 120 through which at least a portion of the liquid content of a pasty material may flow as the latter is displaced toward the outlet 145 by the rotating helical screw 110. Indeed, during its displacement within the screw-compactor 100, the pasty material is compressed against an inner surface of the flexible porous bottom wall 120 by the rotating helical screw 110, thereby causing a portion of the liquid content of the pasty material to pass through the flexible porous bottom wall 120. The extracted liquid is directed to a liquid sump 115 or to any other suitable locations where it may be recycled.

The flexible porous bottom wall 120 may consist of a thin perforated metal screen. The flexibility of the porous bottom wall enables the screw compactor-conveyor 100 to accommodate various quantities of pasty material to be treated.

The screw compactor-conveyor 100 is mounted at the first end thereof to a pivot 175 and at the opposed second end thereof to a telescopic member 160 which could be retracted or extended to modify the elevation of the second end of the conveyor with respect to the first end thereof, as indicated by the arc 180. This permits the adjustment of the inclination of the screw compactor-conveyor 100. Depending on the viscosity of the pasty material to be treated, the compactor-conveyor 100 may be inclined at different angles to thus remove as much liquid as possible.

According to a preferred embodiment which is not illustrated, the porous bottom wall is suspended inwardly of the elongated cylindrical casing 102 above a bottom slotted wall of the latter such that when the pressure exerted against the porous bottom wall 120 reaches a critical point, the same will disengage from the casing 102 to release the excess pressure. The extracted liquid will be evacuated through the slot defined in the bottom wall of the casing 102.

Figure 3A:
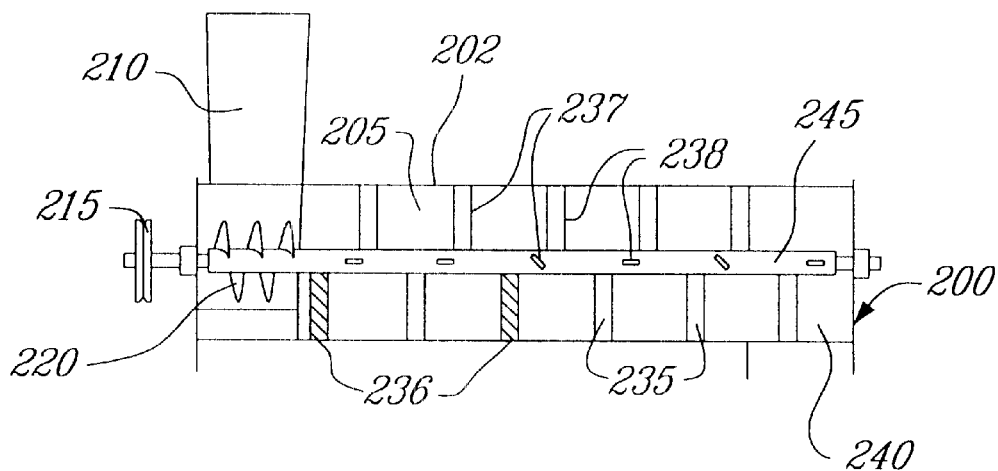
FIGS. 3a and 3b are respectively schematic side elevational views partly in cross-section of a mixer and a cutter-mixer.
Figure 3B:
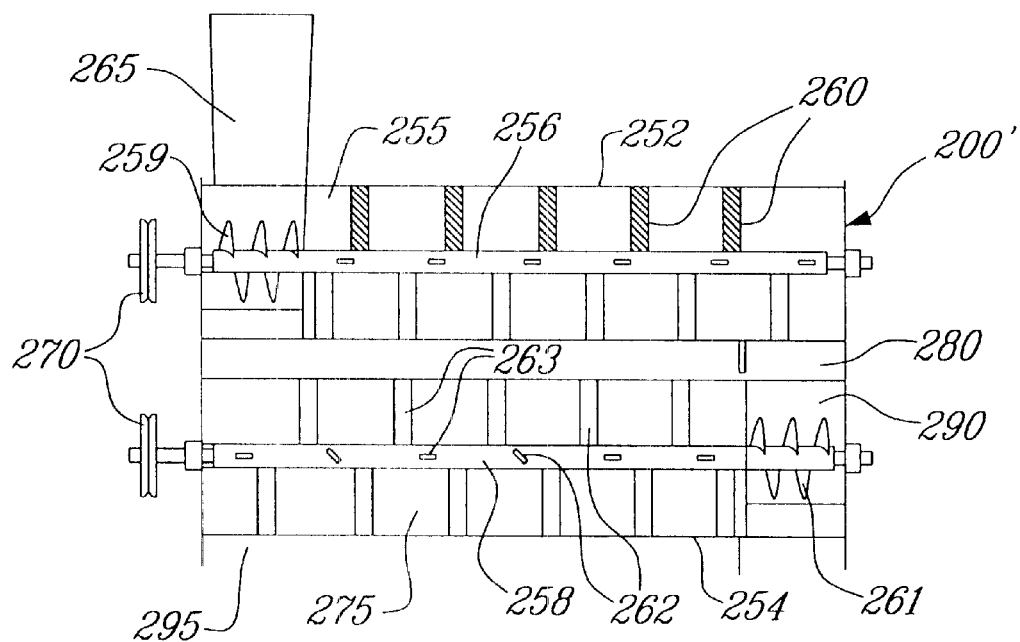

Referring now to FIGS. 3a and 3b, the features of the mixer 200 and cutter-mixer 200' will be described in greater detail. As shown in FIG. 3a, the mixer 200 comprises an elongated cylindrical housing 202 defining a mixing chamber 205 and an inlet 210 adapted to receive the partially dewatered pasty material from the material outlet 145 of the screw-compactor conveyor 100. A rotating shaft 245 concentrically mounted inside of the housing 202 is provided at a first end portion thereof with a plurality of helical blades 220 for regulating the flow of material conveyed to the mixing chamber 205.

The portion of the shaft 245 extending through the mixing chamber 205 is provided with a plurality of radially extending blades 235 and/or cutter blades 236. The shaft 245 may be driven by a motor (not shown) coupled to a conventional pulley and belt arrangement 215 which is in turn connected to the shaft 245. The blades 235 and the cutter-blades 236 are preferably individually adjustable in both angle and length. The cutter-blades 236 serve to cut the bigger pieces or particles of the pasty material, whereas the blades 235 are adapted to pulverize and mix the pasty material and to convey the material towards an outlet 240 defined at a second end of the housing 202. It is understood that depending on their angle, the blades 235 will essentially serve to pulverize and mix the pasty material or to advance the same through the mixing chamber 205.

Straight blades 238 are used for mixing while angled blades 237 are used to move the pasty material towards the outlet 240. The number of blades which are angled, the angle of the blades and the length of the blades are predetermined parameters determined by the material which is being processed, including its viscosity, and the nature of the desired finished product. As mentioned above, the blades 235 may be individually adjustable in both their angle and length. It is also conceivable that the entire shaft 245 may be removable and replaceable with other shafts having preconfigured blade arrangements.

Generally, pasty materials requiring a relatively greater amount of mixing are maintained for a longer period of time within the mixing chamber 205 by adjusting the blades such that their angle with respect to the axis of the shaft 245 is relatively small. Alternatively or conjointly, the number of blades which are angled may be decreased to reduce the advance speed of the pasty material within the mixing chamber 205. Longer blade lengths are employed when the material to be processed is less viscous. As shown in FIG. 3a, the blades 235 are disposed closely together along shaft 245 but in arrays set at 90 degrees to one another. According to the illustrated embodiment, every third blade 237 has an angle. The non-angle blades 238 pulverize the material as the shaft 245 rotates, preferably at about 400 R.P.M.. The pulverizing action has the advantage that less wetting agent is required. This result in a further advantage in that by reducing the required quantity of wetting agent, the amount of drying needed to reduce the moisture content of the pasty material to a desired level is simultaneously decreased.

FIG. 3b illustrates a cutter-mixer 200' comprising a first housing 252 defining a material inlet 265 and a material outlet 280 communicating with a material inlet 290 defined in a second housing 254 directly disposed under the first housing 252 and defining at an opposed end thereof a material outlet 295. The first and second housing 252 and 254 respectively support a first rotating shaft 256 and a second rotating shaft 258. The first rotating shaft 256 is operational to displace the pasty material from the material inlet 265 to the material outlet 280 of the first housing 252, whereas the second rotating shaft is adapted to displace the pasty material entering the material inlet 290 from the material outlet 280 and moving to the material outlet 295 of the second housing 254. According to a preferred embodiment, the shafts 256 and 258 are independently driven by means of conventional belt and pulley arrangements 270 coupled to respective motors (not shown).

The first shaft 256 is provided at a first end portion thereof with a helical blade 259 for regulating the flow of material conveyed to a cutting chamber 255 defined by the housing 252. The portion of the shaft 256 extending within the cutting chamber 255 is provided with a plurality of radially extending cutter-blades 260 adapted to shred the pasty material into fine particles.

As to the shaft 258, it is provided at a first end portion thereof with a helical blade 261 for regulating the flow of pasty material conveyed to a mixing chamber 275 defined by the housing 254. The portion of the shaft 258 extending within the mixing chamber is provided with angled and straight blades 262 and 263 for respectively displacing and mixing the pasty material, as described hereinbefore with reference to FIG. 3a.

It is noted that the above described mixer 200 and cutter-mixer 200' are particularly useful when the proportions of the components forming the substance to be treated are very different. The material leaving the mixer 200 or the cutter-mixer 200' has a smooth and even consistency and is thus ready to be introduced into the pelletizer 300.

However, in many cases, the screw-conveyor compactor 100 and the mixer 200 or cutter mixer 200' are not required and thus the material to be treated may be directly conveyed to the pelletizer 300.

Figure 4A:
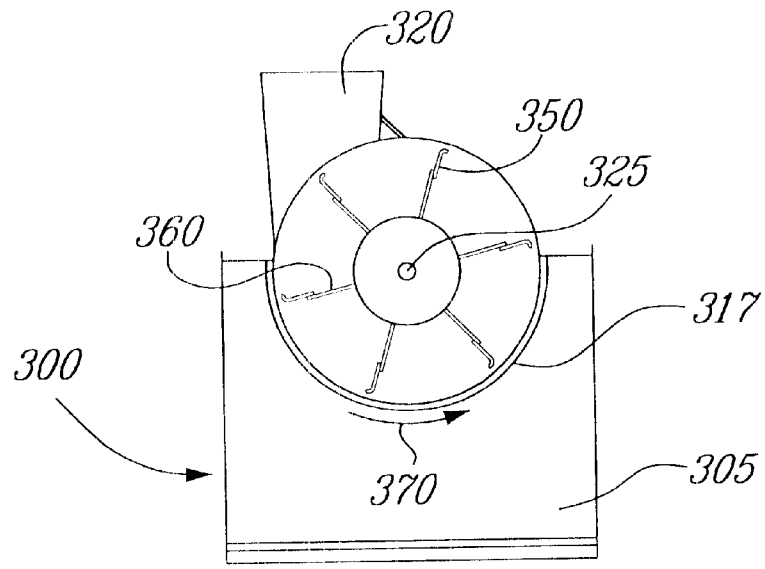
FIGS. 4a and 4b are schematic elevational views partly in cross-section of a single pelletizer.
Figure 4B:
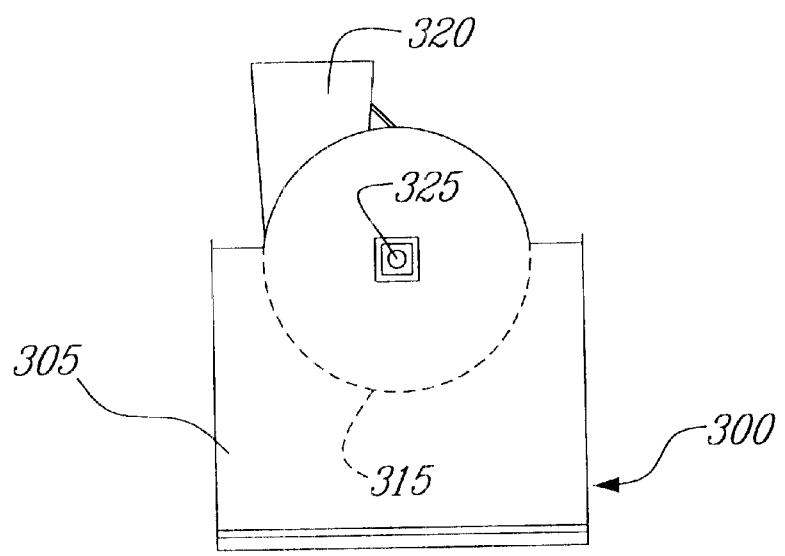

As seen in FIGS. 4a and 4b, the pelletizer 300 includes a housing 305 defining an inlet 320 for receiving the pasty material to be pelletized. The pasty material is deposited in mass on a bottom arcuate perforated plate 315. The arcuate perforated plate 315 defines a plurality of openings through which the material is forced in order to form pellet like-masses. It will be appreciated that, at this stage, the material is rather viscous, and therefore, does not readily flow on it's own. Preferably, the material is forced through the openings of the perforated plate 315 by means of a series of rigid blades 350 mounted to respective vanes 360 extending radially from a drive shaft 325 axially disposed with respect to the perforated plate 315, as shown in FIG. 4a.

Each rigid blade 350 is provided with a curved distal end portion which is oriented in a direction opposite to the rotation of the drive shaft 325, as illustrated by the arrow 370. The rigid blades 350 are disposed and configured such that the curved distal ends thereof are continuously in contact with the inner cylindrical wall of the pelletizer 300, thereby forcing the material immediately preceding the rigid blades 350 through the openings of the arcuate perforated plates 315 which forms the bottom portion of the inner cylindrical wall. More particularly, as the drive shaft 325 rotates in the direction indicated by arrow 370, the blades 350 are swept along the inner surface of the perforated plate 315 causing a pressure on the material, forcing the material through the openings of the perforated plate 315.

The rigid blades 350 are interchangeable with other rigid blades of varying curvatures for adapting the sweeping force necessary to press different kinds of materials through the openings of the arcuate perforated plate 315. For instance, rigid blades 350 having a more open angle would be used for pelletizing a rough and heavy material, as it would applied a higher pressure on the material to thus efficiently force the same through the openings of the arcuate perforated plate 315.

The size of the thus produced pellet-like mass, i.e. the diameter, and/or cross-sectional shape is generally attributable to the size and the shape of the openings of the perforated plate 315, although some shrinkage may occur during the subsequent drying step. The axial dimension of the pellet-like mass can be controlled by imparting a reciprocating motion to an additional similar perforated plate 317 disposed underneath the perforated plate 315. The additional perforated plate 317 may have a longitudinally axially reciprocating motion parallel to the drive shaft 325. The reciprocating motion may be imparted by any conventional motor means such as hydraulic cylinders. The reciprocating motion of the additional perforated plate 317 will cut the pellet-like masses when the openings of the additional perforated plate 317 are in offset relation with the openings of the arcuate perforated plate 315. Accordingly, the reciprocating cycle will determine the length of the pellet-like mass. Thereby, it will be possible to obtain a pellet-like mass all having substantially the same axial dimensions.

As the rigid blades 350 are continuously driven by the drive shaft 325 and as the material is continuously supplied to the pelletizer 300, the thus produced pellet-like mass has constant dimensions.

It is noted that the number, the shape and the rotational speed of the drive shaft 325 as well as the number, the diameter, the disposition and the shape of the openings of the perforated plate 315 are adjusted to suit the application.

Figure 7:
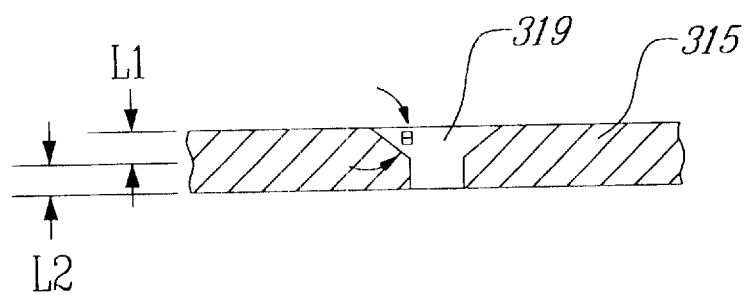
FIG. 7 is an enlarged cross-sectional view of an opening defined in a perforated plate of the pelletizer of FIGS. 4a and 4b.

It has been found that openings having conical configuration produce additional compression and friction on certain types of fluent material. FIG. 7 is an enlarged view of such a cone configurated opening 319 of the perforated plate 315. The angle θ determines the amount of compression obtained on the material to be pelletized. Accordingly, perforated plates 315 with conical openings 319 having different angles θ may be provided for fluent materials having different densities in order to obtain a desired density in the pelletized material. For instance, experimental results have demonstrated that for chicken feathers mixed with appropriate binding agents, an angle θ of approximately 380 degrees doubles the density of the pelletized material compared to what is normally obtained with conventional cylindrical openings. Further experimentation has demonstrated that for biological sludge, an angle θ of approximately 270 degrees triples the density of the pelletized material compared to what is normally obtained with conventional cylindrical openings. It is noted that the longitudinal dimensions of the conical and cylindrical portions of the opening 319, as depicted by 11 and 12 in FIG. 7, are substantially similar. The thickness of the perforated plate 315 is at least equal to ⅛ inch (0,3175 cm).

It is also contemplated to provide perforated plates having oval configured openings as well as slanted openings.

Preferably, the components of the pelletizer 300, including the housing 305, the vanes 360 and the rigid blades 350, are fabricated from materials which are substantially non-degenerative when subjected to high levels of production and which could not be altered by the material to be processed. For instance, when pellets for human or animal consumption are processed, resistant metals such as ni-hard or hardened metals are preferred. Other proved materials like rubber, hard metal, synthetic products, fiberglass and various plastics such as PVC may also be used.

Figure 4C:
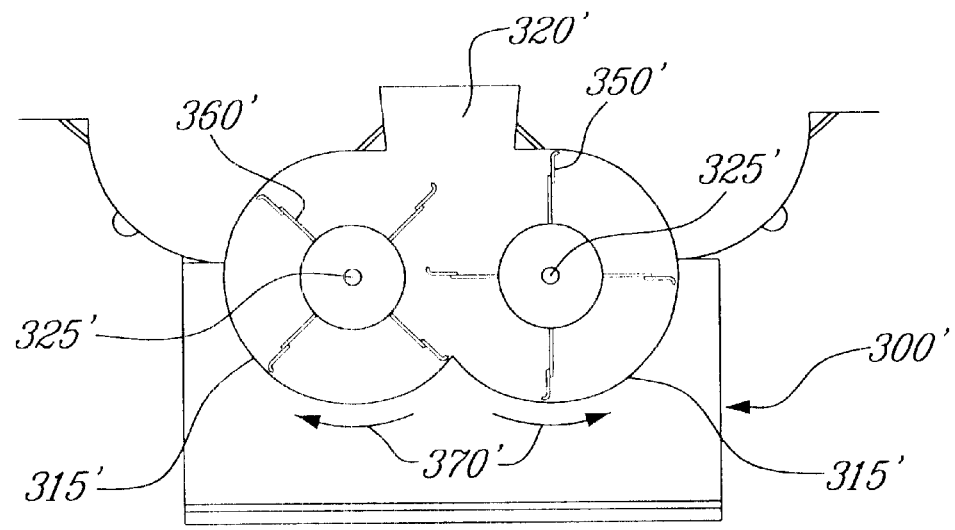
FIGS. 4c and 4d are schematic elevational views partly in cross-section of a multi-pelletizer.
Figure 4D:
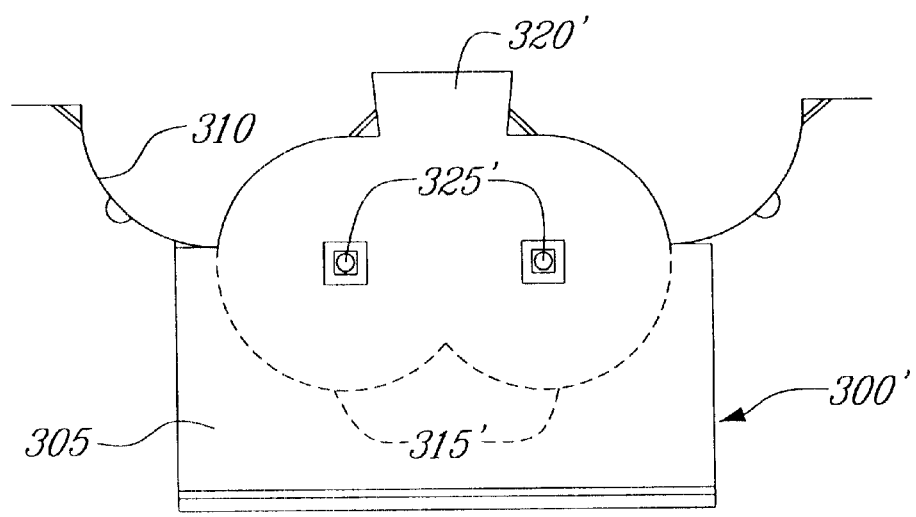

FIGS. 4c and 4d illustrate a multi-pelletizer 300' which is provided with two coaxial drive shafts 325' to increase the production capacity thereof. Each drive shaft 325' is provided with at least four radial vanes 360' which are each adapted to support a blade 350'. The drive shafts 325' are driven in opposite directions to force, at regular intervals, the material supplied to the multi-pelletizer 300' through the adjacent perforated plates 315, respectively.

The pelletizing step gives cohesion to the fluent material and considerably increases the external exposed surface thereof, thereby facilitating and accelerating the subsequent drying process. The pelletizing step also contributes to make the fluent or pasty material physically uniform. Furthermore, the agglomeration of the pasty material resulting from the pelletizing step prevents the formation of dust at later stages of the process. This is important in that, in the past, dust has been the source of explosion of certain types of conventional thermal dryers.

It is also noted that additional products, such as nutrients, coloring and/or odor neutralizing agents, may be added to the pasty material during the pelletizing step. For instance, nutrients and seeds may be added directly to a de-inked sludge to produce a single application soil modifying product.

Figure 5A:
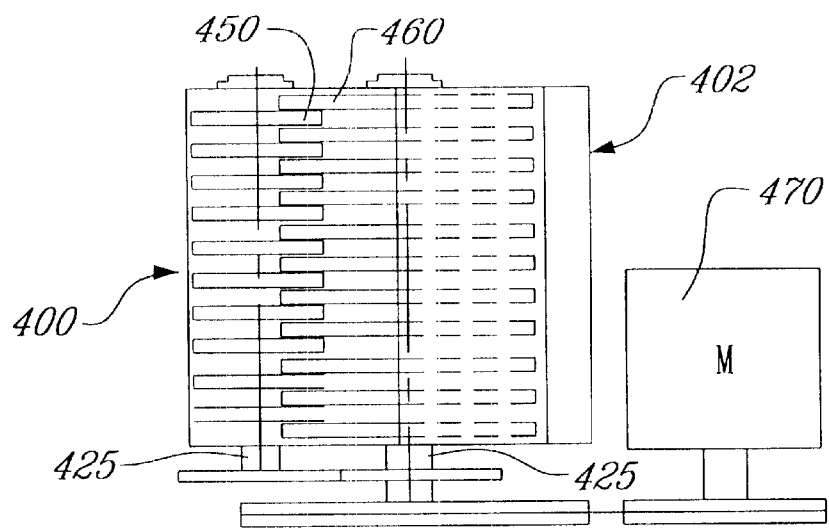
FIG. 5a is a schematic top plan view of a shredder.
Figure 5B:
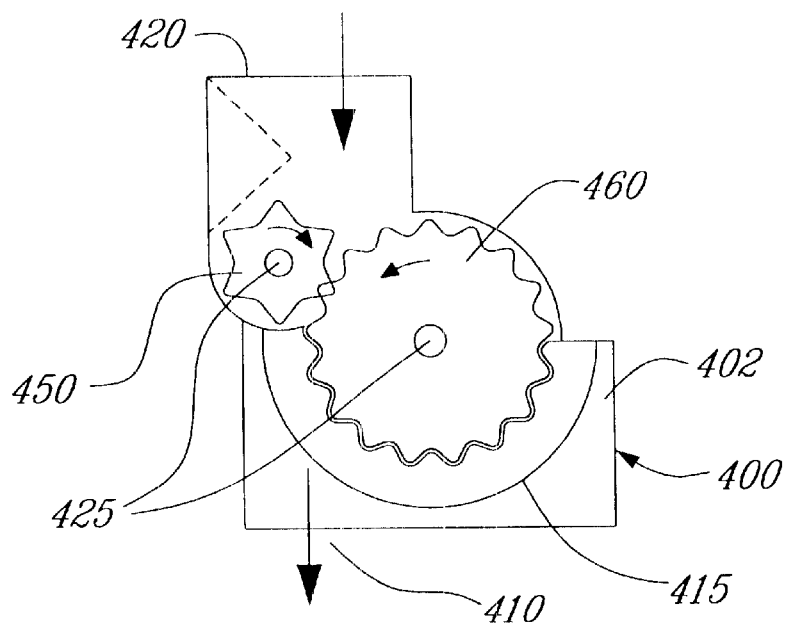

Referring now to FIGS. 5a and 5b, it can be seen that the shredder 400, which is adapted to shred wet solid material into smaller particles, generally includes a housing 402 defining a material inlet 420 through which wet solid material may be introduced. The shredder 400 further includes a set of spaced-apart small diameter crowned discs 450 and a set of spaced-apart large diameter crowned discs 460 respectively mounted along the longitudinal axis of separate parallel shafts 425.

The small and large diameter crowned discs 450 and 460 are in an offset relationship such that each small crowned discs 450 is provided between two adjacent large diameter crowned discs 460. The inverse rotational movement of the two sets of crowned discs 450 and 460 draws the wet solid material to the shredding zone where the material is shredded and forced through a series of fixed semi-circular crowned bars 415 for further cutting and shearing the material before being discharged through outlet 470.

The semi-circular crowned bars 415 are regularly spaced-apart along an axis parallel to the rotating axis of the shafts 425 and are offset relative to the set of large diameter crowned discs 460. Accordingly, there is a fixed semi-circular crowned bar 415 between the bottom portion of each pair of consecutive large diameter crowned discs 460. The space between adjacent semi-circular crowned bars 415 allows the material to pass therethrough. The teeth of the crowned discs 450 and 460 have different shapes and the disc rotation speed can vary depending of the size and the type of materials to be shredded. The two shafts 425 can be either driven by two separated gear motors or by a single gear motor 470 with a conventional assembly of pulleys and gears, as shown in FIG. 5a.

Preferably, the components of the shredder 400, including the rigid discs 450 and 460, and the semi-circular crowned bars 415, are fabricated from a resistant metal such as ni-hard or stainless steel. Other proven materials like rubber, hard metal, synthetic products, fiberglass and various plastics may also be used.

A conveyor may be provided underneath the outlet 410 of the shredder 400 for continuously conveying the shredded material to the dryer 500. It is noted that, at this stage, the maximum dimensions of shredded material should be about three inches (7,62 cm) long, three inches (7,62 cm) wide and ⅜ inch (0,9525 cm) thick to ensure an efficient drying thereof.

Figure 6A:
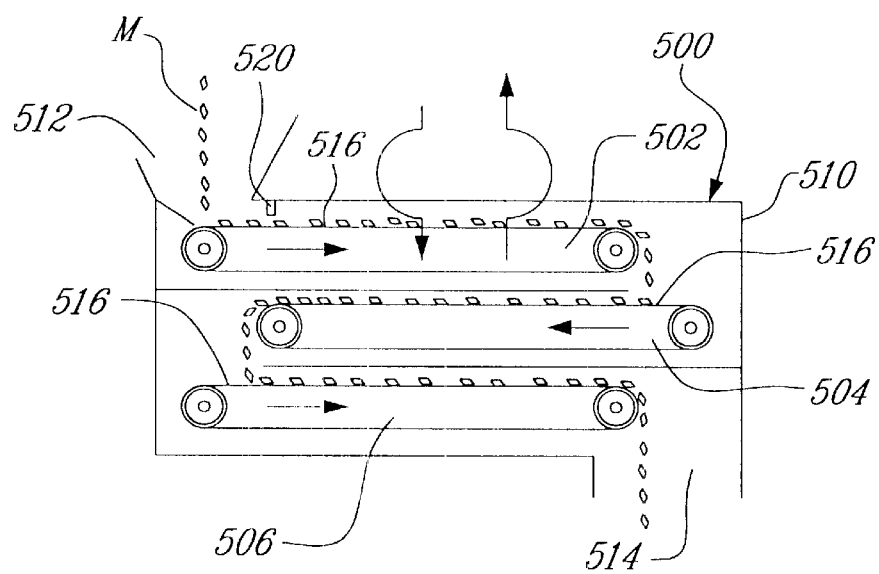
FIG. 6a is a schematic side elevational view of a dryer in accordance with the present invention.
Figure 6B:
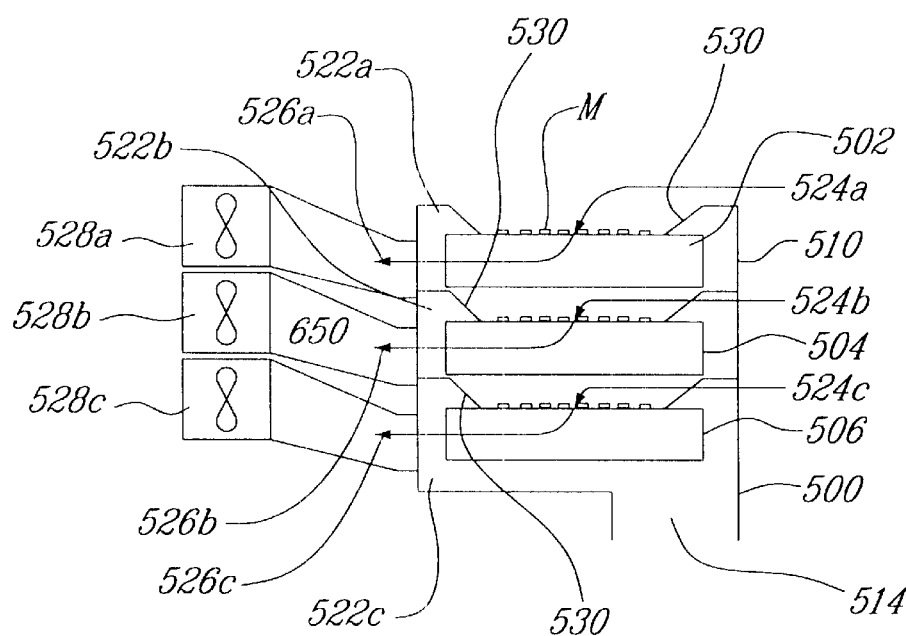

FIGS. 6a and 6b illustrate a dryer 500 which is adapted to receive the pelletized material leaving the pelletizer 300 or the shredded material leaving the shredder 400. More specifically, the dryer 500 includes an upper belt conveyor 502, an intermediate belt conveyor 504 and a lower belt conveyor 506 disposed in superposed relationship internally of a housing 510 defining a material inlet 512 and a material outlet 514.

The superposed belt conveyors 502, 504 and 506 are driven in opposite consecutive directions for conveying the material to be dried from the material inlet 512 to the material outlet 514. Each belt conveyor 502, 504 and 506 is continuously or intermittently driven by means of an individual drive mechanism (not shown) thereby allowing each conveyor to be independently driven at speeds varying as required. Alternatively, the superposed belt conveyors 502, 504 and 506 may be driven by a single drive mechanism (not shown) in the same continuous or intermittent modes. Depending on the application, the conveyors 502, 504 and 506 are driven at speeds varying from about 1 to 15 ft/min.

The intermediate belt conveyor 504 is longitudinally offset with respect to the upper and lower belt conveyors 502 and 506 to enable the material to drop by gravity directly from the upper belt conveyor 502 to the intermediate belt conveyor 504 and from the intermediate belt conveyor 504 to the lower belt conveyor 506.

Each belt conveyor 502, 504 and 506 includes a porous supporting surface 516, such as a perforated belt or perforated metal plates, for allowing a gas treating medium to flow therethrough. For instance, the porous supporting surfaces 516 may consist of woven metallic or synthetic perforated belts. The percentage of openings and the shape and size defined in the supporting surfaces 516 of the conveyors 502, 504 and 506 are selected according to the application.

As shown in FIG. 6a, a spreading bar 520 is disposed at the entry of the dryer 500 to uniformly distribute the material M to be dried on the porous supporting surface 516 of the upper belt conveyor 502. Even distribution of the material M is important to ensure a good exposure of the external surface of each shredded particle or pellet-like mass to the gas treating medium.

The superposed belt conveyors 502, 504 and 506 are each disposed in respective enclosures 522a, 522b and 522c having lateral inlet 524a, 524b, 524c and outlet 526a, 526b, 526c defined along opposed longitudinal sides thereof for allowing independent circulation of a gas treating medium, such as air, through each belt conveyor 502, 504, and 506. Suction fans 528a, 528b and 528c are respectively installed at each outlet 526a, 526b, 526c to cause a transversal flow of air to pass through the material M and then through the porous supporting surface 516 before being expulsed outside of the dryer 500 by the suction fans 528a, 528b and 528c. Accordingly, the air flow rate may be varied for each conveyor 502, 504 and 506. Air seals 530 between the vertical walls of each enclosure 522a, 522b, 522c and the supporting surface of the belt conveyor disposed inside of the enclosure ensure that the air flow passes vertically down and through the material M and then through the supporting surface to provide effective usage of air.

The suction fans 528a, 528b and 528c are adapted to draw air at relatively high velocity, i.e. up to 440 M/min., through the material M thereby causing the moisture in the central portion of each pellet-like mass or shredded particles to migrate to near the external exposed surface thereof and mostly to the undersurface thereof where it can be easily evaporated. This is an important advantage in that the pellet-like mass or shredded particles may be dried from the center thereof instead of from their exterior surface. The vacuum effect considerably increases the speed at which the liquid migrates to the external exposed surface of the material M and thus contributes to reduce the time required to dry a given particle. Furthermore, the friction of the air passing through the material increases the temperature of the air allowing for increased humidity absorption by the air.

Figure 8:
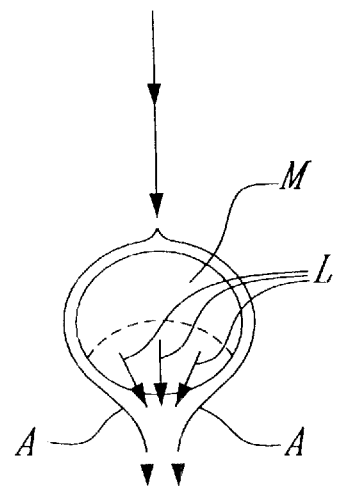
FIG. 8 is a schematic view of a particle illustrating the aerodynamic suction effect generated by the dryer of the present invention.

By drawing air at high velocity through the pellet-like masses or the shredded particles, a negative pressure is created under the material to be dried (i.e. the pellet-like mass or the shredded particles), whereby the liquid in the central portion of the pellet-like mass or shredded particles is drawn downwardly toward the periphery thereof. More particularly, it is the resistance of the air to flow through the pellet-like mass or the shredded particles that reduces the pressure on the downstream sides (i.e. undersurfaces) of the pellet-like masses or shredded particles. The above-described aerodynamic suction effect is schematically illustrated in FIG. 8, wherein the arrows A represent the flow of air around a given particle M and the arrows L depict the migration of the liquid content of the particle M.

The aerodynamic suction effect is an important element of the present drying process. Indeed, because of this aerodynamic suction effect, it is possible to used air at ambient temperature for treating the material to be dried and thus minimize the energy required to operate the drying system. More particularly, satisfactory results have been obtained at temperature as low as 5° C. However, in order to obtain an efficient aerodynamic suction effect, the flow of air passing through one square inch (6,45 cm$^2$) of supporting surface of the belt conveyors 502, 504 and 506 must at least always be equal to 2 CFM (cubic feet per minute) (0,0566 m$^3$/min.). Therefore, a relatively large volume of air must be circulated to obtain the required vacuum effect.

Preferably, the suction fans 528a, 528b and 528c have adjustable blades to enable fine tuning of the air flow to specific conditions.

It is noted that the width of the intermediate belt conveyor 504 may be smaller than that of the upper conveyor 502 and that the width of the lower conveyor 506 may be smaller than that of the intermediate conveyor 504 in order to maintain the negative pressure under the material to be dried substantially constant for each conveyor 502, 504 and 506 although the material may be shrunk during the drying process.

It is important that the speeds of each conveyor 502, 504 and 506 be individually adjusted to control the thickness of the layer of material disposed on each conveyor and to control the residual moisture content of the material.

It is also contemplated to provide an external heat source at the air inlets 524a, 524b and 524c of the dryer 500 for slightly raising the temperature of the air, especially when the same contains a high level of humidity. For instance, increasing the absorbing capacity of moisture-saturated air at 20° C. by 20% requires raising the air temperature by only 2,77° C.

In operation, the pelletized or shredded material to be dried M is conveyed to the material inlet 512 of the dryer 500, whereby it falls down by gravity on the underlying upper belt conveyor 502. As the particles of material M are displaced by the upper belt conveyor 502, the suction fan 528a disposed at the outlet 526a of the enclosure 522a, containing the upper belt conveyor 502, is operated so as to draw a flow of air sideways through the material and then downwardly through the upper belt conveyor 502. The drawn air is then vented in the room or outside the building or can be directed into a dehumidifying unit 600 which can be incorporated in the process. The drawn air may also be recirculated.

Once the particles of material M have reached the opposite end of the upper belt conveyor 502, they fall on the intermediate belt conveyor 504 which is driven in the opposite direction at a speed different from that of the upper belt conveyor 502. The material is then further dried by the flow of air drawn therethrough by the suction fan 528b disposed at the outlet 526b of the enclosure 522b containing the intermediate belt conveyor 504.

Finally, when the particles of material M reach the opposite end of the intermediate belt conveyor 504, they fall onto the lower belt conveyor 506 where they are further dried as per the two preceding steps. The dried particles exiting the dryer 500 may be conveyed to storage facilities or directly be used as a source of combustible.

Although the above dryer 500 includes three superposed conveyors 502, 504 and 506, it is understood that more or fewer conveyors may be provided depending on the intended application. It is also noted that only one suction fan could be provided in combination with an appropriate valve arrangement for regulating the flow of air through the enclosures 522a, 522b and 522c containing superposed conveyors 502, 504 and 506, respectively. Alternatively, more than one suction fan may be provided for each level of conveyor. Finally, it is noted that the air exhausting from one level of conveyor may be recirculated to the same level or to another level in order to draw more moisture.

What is claimed is:

1. A high vacuum, low temperature drying process for reducing moisture content of a moist pasty material having an external exposed surface, comprising the steps of: providing said moist pasty material in the form of pellets; and drawing by vacuum at a low temperature and at a rate of at least 2 CFM (0,0566 m³/min.) per square inch (6,45 cm²) a gaseous drying medium through said pellets from an upstream side to a downstream side thereof, said rate being sufficient to reduce pressure on the downstream side of each pellet, thereby causing moisture located in a central portion of each of said pellets to migrate towards said downstream side thereof.

2. A process as defined in claim 1 comprising the step of separating said moist material into individual pellets prior to drawing a gaseous drying medium therethrough, carrying the individual pellets in a vacuum chamber of a dryer, and forming a vacuum in said vacuum chamber.

3. A process as defined in claim 2, wherein the step of separating said moist material into pieces is effected by compressing said moist material into individual pellets.

4. A process as defined in claim 2, wherein said gaseous drying medium flows by suction from an upstream side to a downstream side of each said individual piece and then through a porous supporting surface on which said individual pellet are disposed.

5. A process as defined in claim 2, wherein said individual pellets are disposed on a porous supporting surface with said downstream side thereof adjacent said porous supporting surface.

6. A process as defined in claim 4, wherein said gaseous drying medium is at ambient temperature.

7. A process as defined in claim 6, wherein said gaseous drying medium is at a temperature in the order of 5 to 25° C.

8. A process as defined in claim 6, wherein said gaseous drying medium consist of air, and wherein said moist material is selected from a group containing: sewage sludge, bagasse, de-inked paper sludge, primary sludge, biological sludge, wood pulp, bleached thermo-chemico mechanical pulp, bark, woodchips, lumber residues and peat.

9. A process as defined in claim 3, wherein said moist material is transformed into a material having a pasty consistency by partially dewatering said moist material, and mixing said moist material so as to obtain a pasty material having a uniform consistency.

10. A process as defined in claim 3, wherein the step of compressing said moist material into pellets includes the steps of selecting a perforated plate from a group of perforated plates according to said moist material to be treated, and forcing said moist material to pass through said perforated plate to form pellets.

11. A process as defined in claim 3, wherein the step of compressing said moist material into pellets includes the steps of passing said moist material through perforated plate means, and transversally cutting said moist material emanating from said perforated plate means at predetermined intervals.

12. A process as defined in claim 11, wherein said perforated plate means define a plurality of openings, and wherein the step of cutting said moist material is effected by imparting a reciprocating motion to an additional similar perforated plate means to alternately align and offset openings of said displaceable perforated plate means with said openings of said perforated plate means.

13. A process as defined in claim 4, comprising the step of conveying said individual pellets from an inlet to an outlet of a drying apparatus while said gaseous treating medium being sucked through said individual pellets.

14. A process as defined in claim 13, wherein said individual pellets are conveyed by a plurality of superposed conveyor means feeding from one to the other in a downward direction, each next lower conveyor means having a narrower supporting surface than that of an upper preceding conveyor means.

15. A process as defined in claim 14, wherein said superposed conveyor means are driven at different speeds from one another.

16. A process as defined in claim 14, wherein said supporting surfaces of said superposed conveyor means are permeable, and wherein for each level of conveyor means, said gaseous drying medium flows sideways downwardly through said individual pellets and through said supporting surface of said conveyor means.

17. A process as defined in claim 9, wherein the step of partially dewatering said moist pasty material includes the steps of:

providing a screw conveyor comprising a screw mounted in a housing defining opposed material inlet and outlet means and having a porous bottom wall through which liquid may flow;

adjusting the inclination of said screw conveyor according to said moist material to be treated to dispose said material outlet means of said screw conveyor at a higher elevation than said material inlet means thereof;

introducing said moist pasty material into said screw conveyor by said inlet material means thereof; and driving said screw so that said moist material be compressed against an inner surface of said porous bottom wall thereby causing some liquid forming said moist pasty material to flow through said porous bottom of said screw conveyor.

* * * * *